Sept. 18, 1928.

M. TEICH

DEVICE FOR INSPECTING TIRES

Filed March 15, 1927

INVENTOR
MAURICE TEICH
BY
ATTORNEY

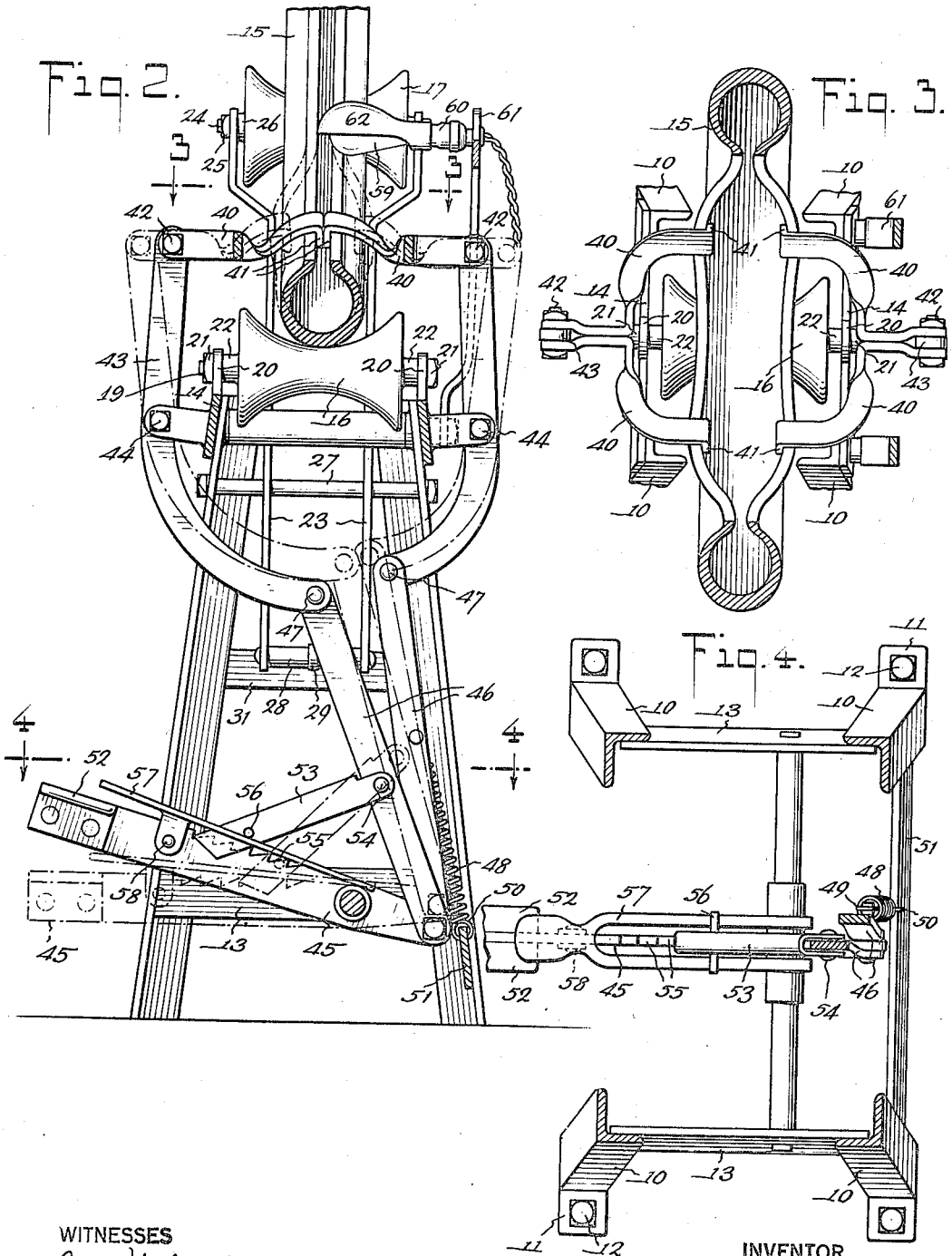

Patented Sept. 18, 1928.

1,685,038

UNITED STATES PATENT OFFICE.

MAURICE TEICH, OF PEEKSKILL, NEW YORK.

DEVICE FOR INSPECTING TIRES.

Application filed March 15, 1927. Serial No. 175,583.

This invention relates to devices particularly adapted for inspecting tires or tire casings.

The principal object of the present invention is the provision of a device characterized by improved features of construction and operation for facilitating the handling of tires and outer tire casings or shoes, when it is desired to inspect the exterior surfaces of the tires and casings, and particularly for inspecting the interior surfaces of tire casings, to detect punctures, cuts and other imperfections.

With the foregoing and other objects in view, the invention resides in the particular provision, relative disposition, and functions of the parts hereinafter fully described and illustrated in the accompanying drawings, in which—

Fig. 2 is a central vertical sectional view substantially on the line 2—2 of Fig. 1.

Fig. 3 is a horizontal sectional view taken on the line 3—3 of Fig. 2.

Fig. 4 is a horizontal sectional view taken on the line 4—4 of Fig. 2.

Figure 1:
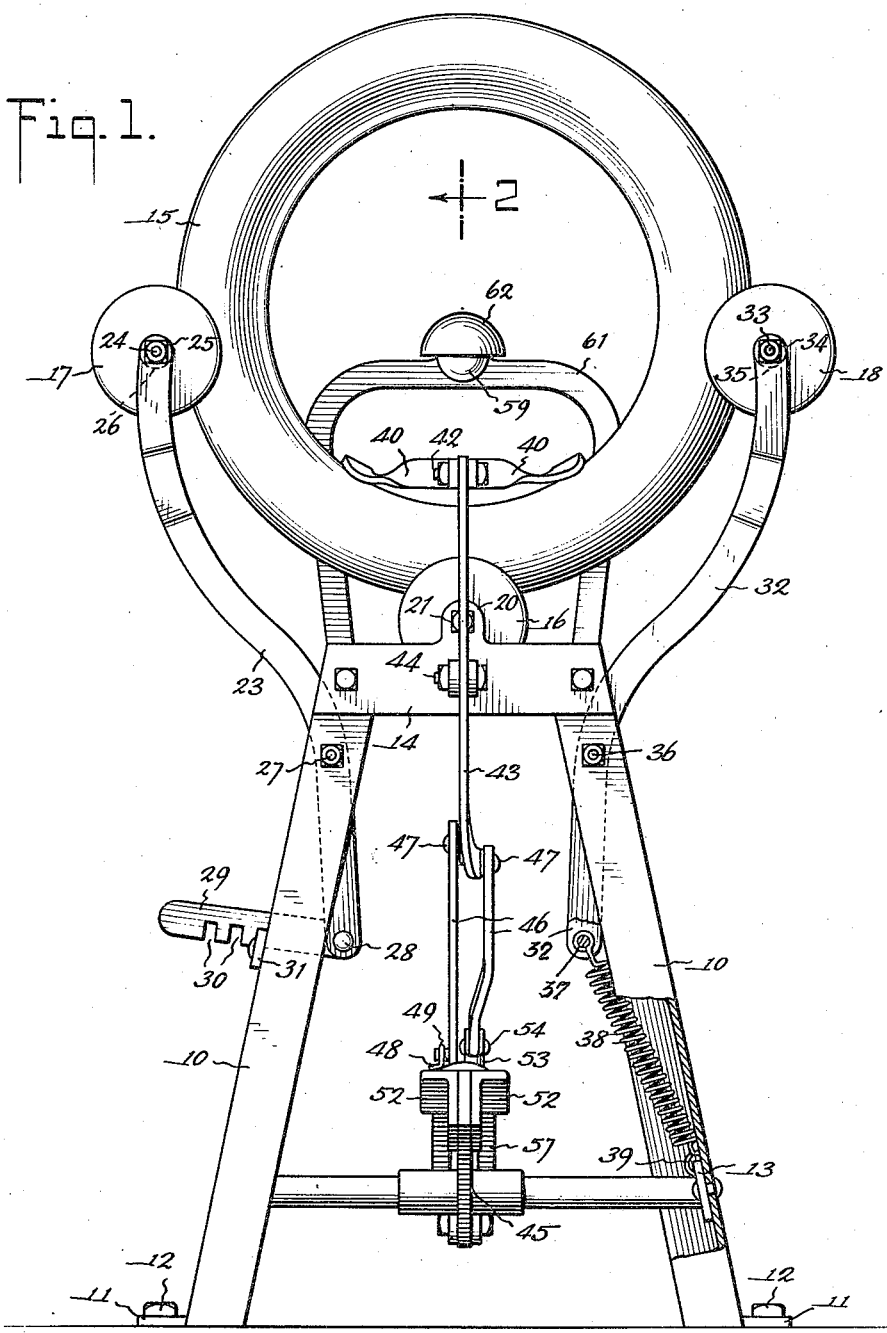
Figure 1 is a front elevation of the device embodying the features of the present invention.

Broadly stated, the device of the present invention consists of a frame structure, means on the frame structure for supporting the tire or tire casing for turning movement, gripping means particularly adapted for gripping the sides of a tire casing, means for actuating the gripping means to spread apart the sides of the tire casing from the normal relationship so that the interior portions of the tire casing may be conveniently and thoroughly inspected, means operable for releasably maintaining the gripping means and therefore the sides of the tire casing in a spread apart condition or relationship, and means for lighting the interior portion of the tire casing at the point where it is spread apart.

The frame structure includes legs or members 10. Each of the members 10 is in the form of an angle iron. Each of the members 10 has an attaching portion 11 adapted to receive a suitable fastening element such as a stud 12 for securing the member to the floor. The members 10 bear a converging relationship and are connected in pairs near their lower ends by members 13 and at their upper ends by members 14.

In order to support a tire or tire casing such as the one designated 15 disposed substantially in a vertical plane for turning movement, there are provided rollers 16, 17 and 18. The rollers are arranged so as to be disposed circumferentially of the tire casing 15, and so that the tire casing will rest on the roller 16 and be guided for turning movement by the coaction of all of the rollers. The roller 16 is mounted for rotation on a shaft 19, the opposite ends of which are respectively journaled in bearings 20 respectively on the members 14. Nuts 21 respectively on the ends of the shaft 19 hold the shaft against longitudinal movement, and suitable spacers 22 on the shaft 19 serve to maintain the roller 16 properly positioned between the bearings 20. The roller 17 which is similar to the roller 16 is mounted for rotation between the upper ends respectively of arms 23. This is accomplished by the employment of a shaft 24 which extends through the roller 17 and the arms 23 and has nuts 25 respectively on the opposite ends, and spacers 26 respectively between the ends of the roller 17 and the arms 23. A shaft 27 carried by a pair of the frame members 10 extends through the arms 23. The arms 23 are therefore mounted for pivotal movement. The lower ends of the arms 23 are connected together by a member 28 which serves as an arbor for a member 29. The member 29 is connected at one end with the member 28 and has a series of notches 30, each of which is adapted to receive a portion of a member 31 connected with a pair of the frame members 10. The notched member 29 and the member 31 constitute a means for adjusting the rollers 17 with respect to the other rollers, to the end that tires or tire casings of different sizes or diameters may be accommodated. It will be obvious, that by imparting upward pivotal movement to the member 29 it is possible to disengage a portion of the member 31 from any particular one of the notches 30 and to engage said portion in any one of the other notches by lowering the member 29. The roller 18 which is similar to the rollers 16 and 17 is mounted for rotation between the upper ends respectively of arms 32. This is accomplished by the use of a shaft 33 which extends through the roller and the arms 32, and nuts 34 respectively on the ends of the shaft 33, and spacers 35 respectively between the opposite ends of the roller 18 and the ends of the arms 32. A shaft 36 carried by a pair of the frame members 10 extends through the arms 32. The arms 32 are thus mounted for pivotal movement. The lower ends of the arms 32 are connected together by a member 37. A coil spring 38 is employed and has one end thereof connected with the member 37, and the opposite end thereof is connected as at 39 with one of the members 13. The spring 38 constitutes a tensioning means and exerts pressure on the casing 15 through and by virtue of the arms 32 and roller 18, and as a consequence the casing 15 is kept in contact with the roller 17. It will also be obvious that the casing 15 under its own weight rests mainly upon the roller 16. In this way the tire casing 15 is supported for turning movement or rotation.

In order to spread side portions of the casing 15 apart, as shown most clearly in Fig. 3, there is provided gripping means, which, in the present instance consists of pairs of grippers 40. Each gripper 40 has an engaging portion 41 at one end and the opposite end is pivotally connected as at 42 with a lever 43. The grippers 40, as stated are arranged in pairs, there being two levers 43, one at the front and one at the back of the frame structure with each of which a pair of the grippers 40 is pivotally connected. Each lever 43 is fulcrumed as at 44 on the adjacent frame member 14. One of the levers 43 is somewhat longer than the other lever.

In order to actuate the levers 43 to cause the relative separation of the grippers 40, there is provided a manually operable means which includes a foot lever 45 carried by the frame members 13 and links 46, each of which has one end thereof connected with one end of the lever 45 and the opposite ends of the links 46 are connected respectively with the levers 43 as at 47. A coil spring 48 is employed and has one end thereof connected as at 49 with one end of the links 46, and the opposite end of the spring is connected as at 50 with a member 51 connected to a pair of the frame members 10 near their lower ends. The spring 48 has a normal tendency to bring the grippers 40 toward each other to the relationship shown in full lines in Fig. 2. At this time the foot lever 45 will be disposed with its front end up. The front end of the foot lever 45 has members 52 secured thereto to accommodate the foot of an operator, the operator by bearing down on the members 52 with his foot will cause the lever 45 to move the grippers 40 in opposite directions, through the intervention of the link 46 and the levers 43, and as a consequence side portions of the tire casing 15 will be spread apart due to the fact that the portions 41 of the grippers 40 are in engagement with the side portions of the casing.

In order to releasably maintain the grippers 40 in the relationship in which they spread the side portions of the tire casing apart, there is provided a means which functions in conjunction with the means for actuating the grippers 40. The said means includes a pawl 53 pivotally connected at one end with one of the links 46 as at 54 and the opposite end thereof is adapted to coact with a series of teeth 55 on a portion of the lever 45. The pawl 53 carries a pin 56. An actuator 57 is pivotally connected as at 58 with the lever 45. The actuator 57 coacts with the pin 56 to elevate the pawl 53 to disengage the same from one of the teeth 55. The pawl 53 being pivotally connected at one end acts by gravity to cause the engagement of the opposite end thereof with one of the teeth 55 when the foot lever 45 is moved downwardly from its normal position shown in full lines in Fig. 2 depending upon the distance the lever 45 is moved. It will therefore be understood that when the foot lever 45 is moved to cause the relative separation of the grippers 40 to spread the side portions of the tire casing 15 apart, the pawl 53 will automatically engage one of the teeth 55 and thus releasably hold the grippers 40 separated to the desired extent. By pressing down on the end of the actuator 57 adjacent the foot members 52, the pawl 53 will be elevated by virtue of the coaction of portions of the actuator 57 with the pin 56, and as a consequence the spring 38 functions to pull on one of the links 46 which in turn exerts a pull on the lever 43 connected therewith, and on the other link 46 and the lever 43 connected therewith causing the grippers 40 to move toward each other to a normal position; the lever 45 being also moved to its normal position. When the grippers 40 have again assumed their normal relationship, the tire casing 15 may be turned to any desired degree, whereupon, the foot lever 45 may again be depressed to cause a relative separating movement of the grippers 40 and the spreading apart of the side portions of the tire casing 15. The grippers 40 are always in position ready for the spreading action to and the releasing of the side portions of the tire casing.

In order to light up the interior of the tire casing there is provided an electric lamp 59 which is electrically connected with a fixture 60 carried by a bracket 61 secured to the rear frame member 14. The fixture 60 includes a reflector 62 to reflect the light rays into the interior of the casing 15 as will be understood.

It is to be understood that the invention is not restricted to the precise arrangement of parts shown and described, as details of construction may be modified and rearranged without departing from the spirit of the invention, the scope of which is limited only by the terms of the appended claims.

I claim:

1. A device of the character described comprising an upright support, arms pivotally connected respectively with portions of said support, an arrangement of rollers, one roller being on said support and one roller on each of said arms, means acting in conjunction with said arms for changing the relative disposition of said rollers, said means consisting of a spring connected between one of said arms and said support, and a latch for holding the other arm in different adjusted position.

2. A device for inspecting an outer tire casing comprising an upright support, arms pivotally connected respectively with portions of said support, an arrangement of rollers for supporting the tire casing for rotatory movement, one roller being on said support and one roller on each of said arms, means acting in conjunction with said arms for changing the relative disposition of said rollers, said means consisting of a spring connected between one of said arms and said support, and a latch for holding the other arm in different adjusted positions; and means for spreading apart the sides of the tire casing from a normal relationship.

MAURICE TEICH.